United States Patent
Correia

(10) Patent No.: US 12,431,759 B2
(45) Date of Patent: Sep. 30, 2025

(54) HOUSING FOR AN ELECTRICAL MACHINE WITH A SELF-VENTING COOLING JACKET

(71) Applicant: Volkswagen Aktiengesellschaft, Wolfsburg (DE)

(72) Inventor: Claudenê Correia, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 161 days.

(21) Appl. No.: 18/238,093

(22) Filed: Aug. 25, 2023

(65) Prior Publication Data

US 2023/0402898 A1    Dec. 14, 2023

Related U.S. Application Data

(63) Continuation of application No. PCT/EP2022/054414, filed on Feb. 22, 2022.

(30) Foreign Application Priority Data

Feb. 25, 2021   (DE) ............... 10 2021 201 804.1

(51) Int. Cl.
    *H02K 5/20*    (2006.01)

(52) U.S. Cl.
    CPC ................... *H02K 5/203* (2021.01)

(58) Field of Classification Search
    CPC .................................. H02K 5/203
    See application file for complete search history.

(56) References Cited

U.S. PATENT DOCUMENTS

| | | | | |
|---|---|---|---|---|
| 6,900,561 | B2 * | 5/2005 | Vlemmings | H02K 5/203 310/58 |
| 6,909,210 | B1 * | 6/2005 | Bostwick | H02K 5/203 310/58 |
| 9,819,247 | B2 * | 11/2017 | Leberle | H02K 9/197 |
| 2005/0268464 | A1 * | 12/2005 | Burjes | F28F 3/12 29/890.035 |
| 2022/0290637 | A1 * | 9/2022 | Tartakovsky | F02M 25/12 |

FOREIGN PATENT DOCUMENTS

| | | |
|---|---|---|
| DE | 102012008209 A1 | 10/2013 |
| DE | 102012215018 A1 | 2/2014 |
| DE | 102014204816 A1 | 9/2015 |
| EP | 3544156 A1 | 9/2019 |
| JP | 6042000 B2 | 12/2016 |

OTHER PUBLICATIONS

International Search Report dated Jul. 15, 2022 in corresponding application PCT/EP2022/054414.

* cited by examiner

*Primary Examiner* — Devon Lane

(74) *Attorney, Agent, or Firm* — Muncy, Geissler, Olds & Lowe, P.C.

(57) ABSTRACT

A housing for an electrical machine, which housing is formed with a cylindrical cooling jacket through which coolant is able to flow and which has a plurality of cooling channels that extend in the circumferential direction and an inlet section acting as a distributor and an outlet section acting as a collector, wherein, between the inlet section and the outlet section, there is arranged a partition wall in which a bypass is located, through which gas bubbles present in the inlet section can be diverted directly to the outlet section. The cooling channels extending in the circumferential direction are connected by at least one transversely extending venting channel.

12 Claims, 5 Drawing Sheets

HOUSING FOR AN ELECTRICAL MACHINE WITH A SELF-VENTING COOLING JACKET

This nonprovisional application is a continuation of International Application No. PCT/EP2022/054414, which was filed on Feb. 22, 2022, and which claims priority to German Patent Application No. 10 2021 201 804.1, which was filed in Germany on Feb. 25, 2021, and which are both herein incorporated by reference.

BACKGROUND OF THE INVENTION

Field of the Invention

The present invention relates to a housing for an electrical machine, which housing is formed with a cylindrical cooling jacket through which coolant is able to flow and which has a plurality of cooling channels that extend in the circumferential direction and an inlet section acting as a distributor and an outlet section acting as a collector.

Description of the Background Art

An electrical machine can be understood to be, for example, an electromechanical transducer that converts electrical energy into mechanical energy and/or mechanical energy into electrical energy, wherein heat is also released, so that cooling is necessary.

DE 10 2014 204 816 A1 describes an electrical machine with a housing which has a fluid channel for guiding a coolant flow. The fluid channel comprises an inlet section, a circumferential or intermediate section divided into a plurality of subchannels by circumferential ribs, and an outlet section. A separation section formed with a bypass is located between the inlet section and the outlet section. This bypass basically creates a direct connection between the inlet and outlet. Although this is not described in DE 10 2014 204 816 A1, venting of the inlet section may be possible via such a direct connection, such that any gas bubbles present in the inlet section can be diverted through the bypass into the outlet section.

SUMMARY OF THE INVENTION

It is therefore an object of the present invention to improve the venting or venting function of the cooling jacket in a relevant housing.

In an exemplary embodiment, the housing of the invention for an electric machine, wherein this is, for example, an electric motor (E-motor) and/or a generator, is formed with an (at least approximately) cylindrical cooling jacket (hereinafter also referred to simply as cooling jacket) through which coolant is able to flow and which in this regard can also be referred to as a liquid-cooled housing. The cooling jacket has a plurality of cooling channels or circumferential channels that extend in the circumferential direction (of the cooling jacket) and an inlet section acting as a distributor, at which the cooling channels extending in the circumferential direction begin or from which these cooling channels lead off, and an outlet section acting as a collector, at which the cooling channels extending in the circumferential direction end or into which these cooling channels open. A partition wall or the like is arranged between the inlet section and the outlet section and separates the inlet section and the outlet section. In the partition wall there is (at least) one bypass connecting the inlet section and the outlet section. Gas bubbles possibly present in the inlet section can be diverted directly to the outlet section via this bypass (the term "gas bubbles" expressly comprises air and vapor bubbles, as well as an accumulation of gas or vapor or air forming a single gas, vapor, or air bubble). Furthermore, the gas bubbles can then be discharged from the cooling jacket via an outlet opening. This venting process, which runs more or less by itself, can also be referred to as self-venting.

The bypass can be arranged in the partition wall so that it ends as close as possible to an outlet opening in the outlet section and/or is directed towards this outlet opening, so that the gas bubbles diverted from the inlet section through the bypass can be discharged from the cooling jacket in the most direct way possible.

The cooling channels of the cooling jacket, which channels extend in the circumferential direction, can be connected by at least one transversely extending venting channel, i.e., a channel extending transversely to the respective cooling channels. This means that multiple or even all of the cooling channels which are circumferential or extend in the circumferential direction are interlinked or interconnected by a venting channel or optionally by multiple venting channels. Preferably, the at least one venting channel is arranged on the inlet side; i.e., it is preferably located in the vicinity of the inlet section or in the beginning region of the circumferential cooling channels. The following explanations refer in part to only one venting channel in a non-limiting manner. Further, the terms "cooling channels extending in the circumferential direction" and "circumferential cooling channels" and "circumferential channels" are used synonymously.

Gas bubbles can accumulate in the circumferential cooling channels, in particular near the inlet section or in the beginning region, and these bubbles do not move to either the outlet section or the inlet section during operation, but are more or less stuck. Tests and simulations have shown that a venting channel, which interconnects or interlinks the cooling channels extending in the circumferential direction in the affected region has a positive effect on the venting of the cooling channels. This venting channel is more or less a transverse channel which extends transversely to the circumferential cooling channels and is referred to as a venting channel due to its intended venting function. This venting channel can be formed, for example, as a groove or also as a bore.

Depending on the arrangement and design of the venting channel (various embodiment options or examples will be explained in more detail below), the gas bubbles accumulating in a circumferential cooling channel or in multiple circumferential cooling channels can move or return through the venting channel directly (i.e., by a direct route) to the inlet section and, in particular, to the bypass and/or can move or return indirectly (i.e., not by a direct route) to the inlet section and, in particular, to the bypass. In the latter case, the gas bubbles can move through the venting channel to other cooling channels or are diverted through the venting channel into other cooling channels and can there (against the direction of flow of the incoming coolant) move further to the inlet section or return (i.e., depending on the situation, the gas bubbles more or less by themselves look for a favorable path to the inlet section or bypass). Furthermore, the gas bubbles can then be diverted via the bypass to the outlet section and from there be discharged from the cooling jacket. (Thus, the combination of a bypass and venting channel is essential to the invention.) In this way, a very effective and almost complete venting or self-venting of the cooling jacket is achieved during operation, as a result of which local overheating (hotspots) is avoided or at least reduced. The venting or venting function is thus improved.

A horizontal or "lying" orientation of the cylindrical cooling jacket can be preferably provided, in particular associated with a horizontal arrangement of the electrical machine in the housing. With regard to this horizontal or lying orientation, it is provided in particular that the venting channel is located on the downflow cooling jacket side or in the downflow cooling jacket half, therefore, where the coolant flows from top to bottom through the circumferential cooling channels, and is located above a horizontal center plane of the cooling jacket (more or less in the second quadrant; see below).

With regard to a horizontal or lying orientation (see above), it can also be provided that the inlet section, and in particular also the outlet section and the partition wall, is/are arranged at the top, more or less in the uppermost region. The same applies in particular to the bypass. The venting channel is then located below the upper inlet section or is arranged lower than the inlet section and in particular above a horizontal center plane of the cylindrical cooling jacket, so that the gas bubbles can reach the inlet section or bypass in the manner explained above.

The venting channel can be formed straight, i.e., have a straight course, in particular such that it extends substantially in the axial direction of the cylindrical cooling jacket or parallel to the central axis of the cylindrical cooling jacket. However, the venting channel can also be formed curved or arcuate, at least in sections, i.e., have a curved or arcuate course, in particular such that it extends obliquely or at an angle to the central axis of the cylindrical cooling jacket.

The venting channel can extend (with a straight or at least partially curved course) between the two axially outermost cooling channels of the cylindrical cooling jacket, said channels extending in the circumferential direction, in particular such that it more or less connects all cooling channels extending in the circumferential direction. This enables indirect venting of the cooling channels extending in the circumferential direction, as described above.

The venting channel can also open directly into the inlet section at at least one of its ends or venting channel ends, in particular in the immediate vicinity of the bypass or its inlet opening. This is achieved by a corresponding design of the venting channel or its course and/or the inlet section. The gas bubbles can thus move or return through the venting channel directly into the inlet section. The venting channel can also be directed or oriented towards the bypass or its inlet opening at one of its ends or venting channel ends (basically as an imaginary extension).

The cooling jacket can be constructed of an outer housing (outer heat sink) and an inner housing (inner heat sink). The inner housing is formed (on its outer side facing the outer housing) with circumferential ribs and circumferential grooves located therebetween (which form the cooling channels extending in the circumferential direction). Preferably, the venting channel is also formed on the inner housing, in particular in the form of a transverse groove cutting through the circumferential ribs or connecting the circumferential grooves. The transverse groove preferably has substantially the same depth or a similar depth as the circumferential grooves or circumferential channels; i.e., the transverse groove cuts through or breaks through the circumferential ribs over their entire (radial) height to the groove bottom. The inner housing is preferably formed as a one-piece cast part, preferably a metal cast part, wherein it is provided in particular that both the circumferential ribs and circumferential grooves as well as the transverse groove are produced by casting, i.e., by primary shaping. The transverse groove can also be created by machining after casting. In principle, the venting channel can also be designed as a transverse bore.

The housing of the invention can be used for cooling an electrical machine, which is arranged in particular in the housing. It is preferably provided that a flow of coolant through the cooling jacket is generated with the aid of a pump, wherein, in particular, a varying pump pressure and/or a varying pump delivery rate are provided. In low-pressure phases, i.e., in phases with a lower pressure (wherein pressure values of almost 0 bar are also possible), the gas bubbles can return to the inlet section or rise to the inlet section more easily, as explained. A varying or changing pump pressure and/or a varying or changing pump delivery rate thus enable an improved venting or self-venting.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
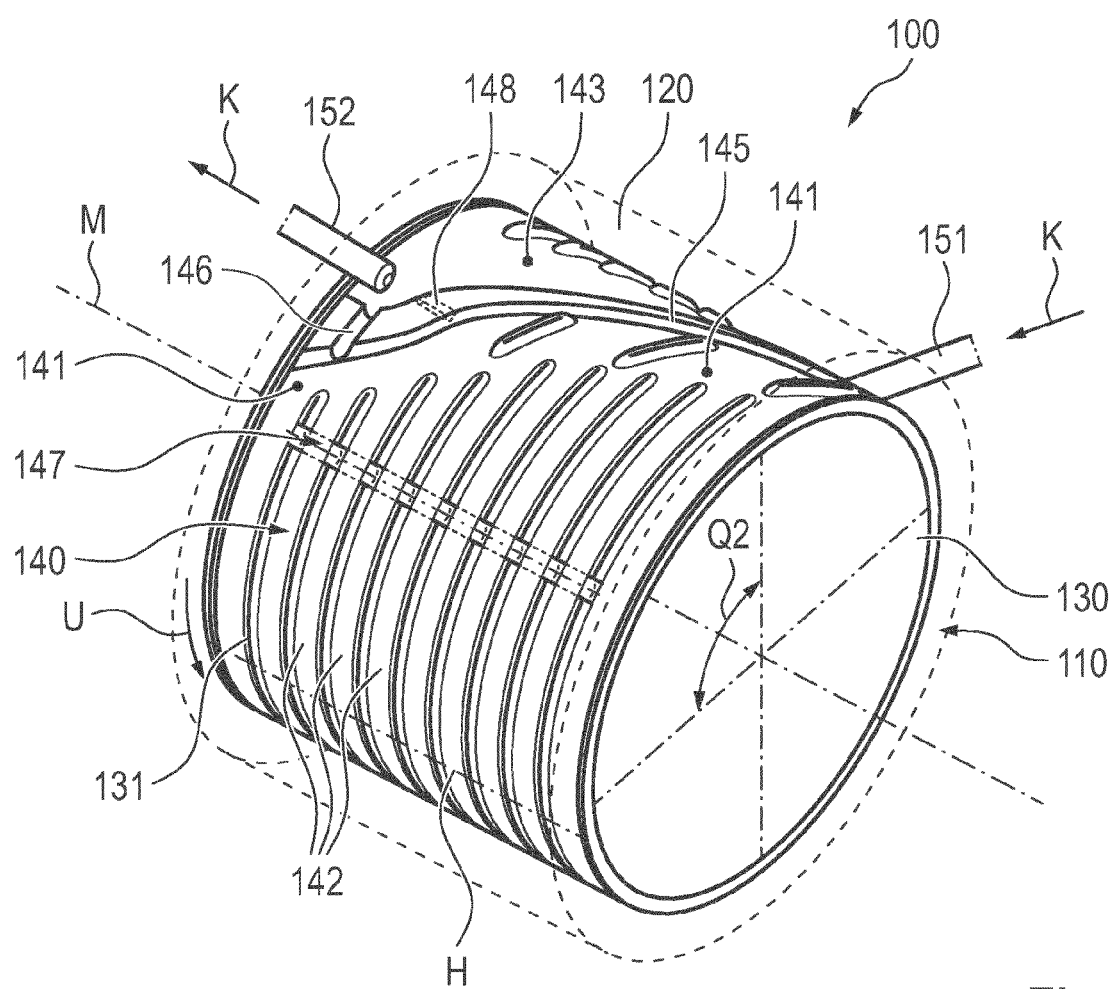
FIG. 1 shows a perspective illustration of an example of a housing of the invention.

FIG. 1 shows housing 100 in a lying or horizontal orientation corresponding to the preferred installation position. Housing 100 is constructed from an outer housing 120, which is only schematically indicated, and a shell-like inner housing 130, and has an interior space 110 for receiving an electrical machine. Interior space 110 can also have a different shape. To cool the electrical machine disposed in interior space 110, housing 100 is formed with an integrated cylindrical cooling jacket 140. Said cooling jacket 140 constitutes a hollow space within housing 100, which jacket substantially completely surrounds interior space 110 and through which coolant K flows. Thus, strictly speaking, cooling jacket 140 is (at least approximately) ring-cylindrical or annular-cylindrical in shape. For example, cooling jacket 140 can have a diameter of 200 mm to 300 mm and an axial length of 100 mm to 300 mm.

Cooling jacket 140 comprises a plurality of circumferential cooling channels 142 or channels extending in the circumferential direction U, and an inlet section 141 and an outlet section 143. Circumferential cooling channels 142 begin at inlet section 141 or below inlet section 141 and end at outlet section 143. Inner housing 130 is formed with circumferential ribs 131, between which circumferential cooling channels 142 in the form of circumferential grooves 132 are located (see FIG. 2), wherein circumferential ribs 131 have a beginning which is offset in the circumferential direction U. Circumferential ribs 131 can have a (radial) height of 3 mm to 5 mm, wherein this essentially corresponds at the same time to the (radial) depth of circumferential grooves 132 or cooling channels 142. Between inlet section 141 and outlet section 143 is an obliquely or diagonally extending partition wall 145, which is formed as a separating web on inner housing 130. Inlet section 141, outlet section 143, and partition wall 145 are arranged at the top with respect to the horizontal installation position shown.

Coolant K is introduced into inlet section 141 via an inlet opening or bore 151 and is distributed from there to all cooling channels 142 extending in the circumferential direction U. Inlet section 141 thus acts as a distributor. In inlet section 141, there are a plurality of flow guide elements formed as ribs, which promote distribution. Coolant K flows through circumferential cooling channels 142 in the circumferential direction U and accumulates in outlet section 143. Outlet section 143 thus acts as a collector. Flow guide elements can also be arranged in outlet section 143. Coolant K is discharged from outlet section 143 via an outlet opening or bore 152 located at the top. Here, inlet opening 151 and outlet opening 152 are located at opposite axial ends of cooling jacket 140, wherein the axial cooling jacket end at inlet opening 151 may also be referred to as the front cooling jacket end or front cooling jacket region, and the axial cooling jacket end at outlet opening 152 may also be referred to as the rear cooling jacket end or rear cooling jacket region.

Figure 2:
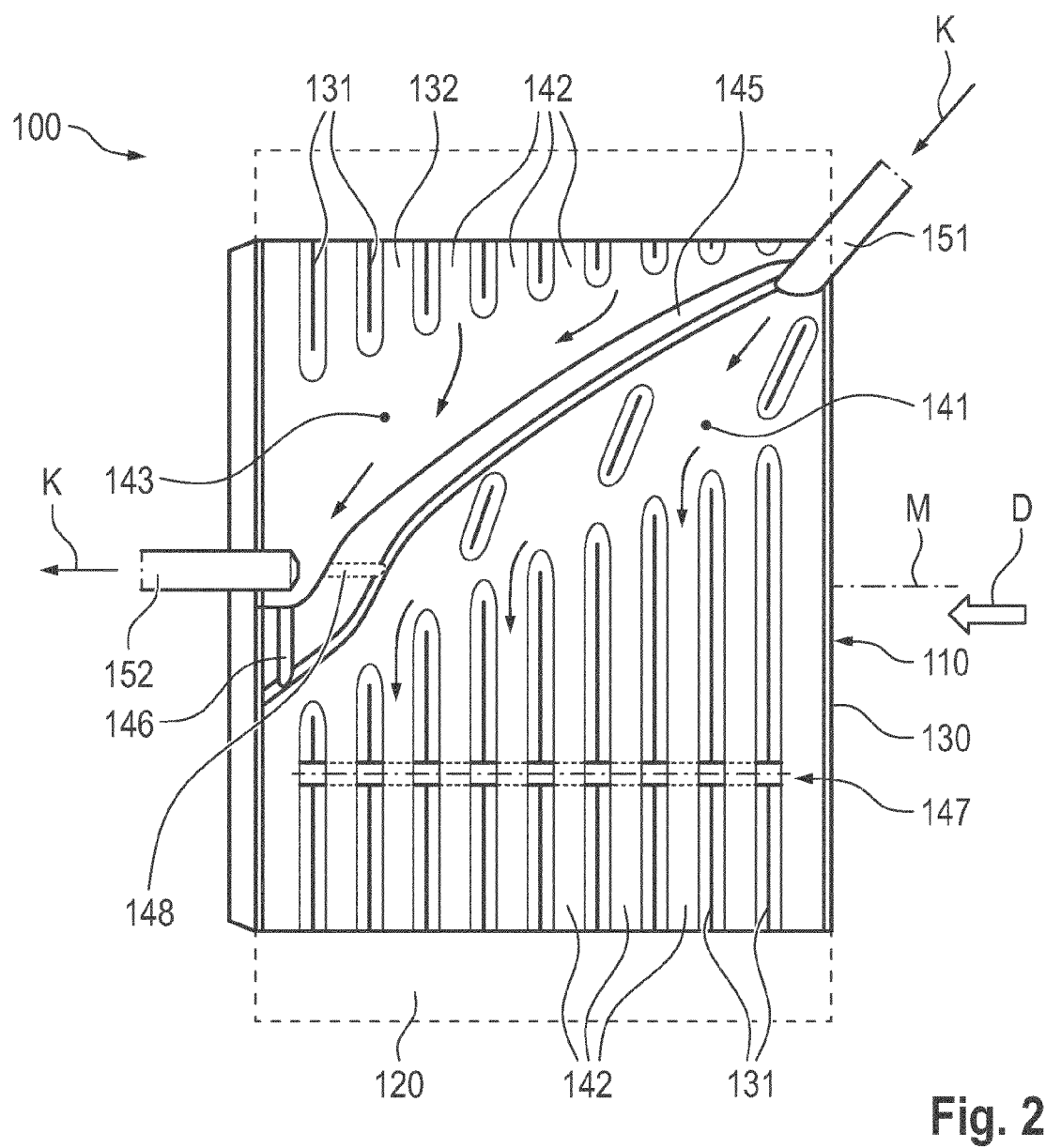
FIG. 2 shows the housing of FIG. 1 in a view from above.

The coolant flow or cooling agent throughput generated using a pump during operation is illustrated by flow arrows in FIG. 2. For example, the pump delivery rate is in the range of 2 L/min to 10 L/min. As can be seen in particular in FIG. 1, cooling jacket 140 has a downflow cooling jacket side or half in which the coolant K flows from top to bottom, and an upflow cooling jacket side or half in which the coolant K flows from bottom to top (up to outlet section 143).

Gas bubbles can accumulate in the upper inlet section 141, in particular during breaks in operation (i.e., when the pump is switched off or not in operation). Even after the initial filling of cooling jacket 140 with coolant K, so-called residual air may be present which accumulates in inlet section 141 (such residual air is basically an accumulation of air which is not distinguished from gas bubbles in the following; see above). During breaks in operation, the gas bubbles can be diverted into outlet section 143 through an optional passage 148 formed in partition wall 145 (passive venting). Passage 148 and outlet opening 152 are located at approximately the highest point of cooling jacket 140. During the subsequent operation, the gas bubbles present in outlet section 143 are then basically sucked out through outlet opening 152. Such venting during pauses through passage 148 is not required for a cooling jacket 140 with the operational venting, explained below, but nevertheless such a passage 148 can optionally be provided (basically as an auxiliary bypass).

For operational venting (by which is meant active or dynamic venting during ongoing pump operation), a bypass 146 formed as a groove (or possibly also as a bore) is arranged in partition wall 145, which bypass connects inlet section 141 with outlet section 143. This bypass 146 can have a width of 1 mm to 3 mm. Gas bubbles can be diverted directly via this bypass 146 (i.e., not via cooling channels 142) to outlet section 143. Bypass 146 is located at the rear cooling jacket end in the rearmost section of partition wall 145 above the last circumferential cooling channel 142. In addition, bypass 146 extends substantially in the circumferential direction U and/or upwardly at an angle to take advantage of an air buoyancy effect. Bypass 146 or its exit opening is directed towards outlet opening 152 in outlet section 143, so that the gas bubbles diverted from inlet section 141 are discharged from cooling jacket 140 in the most direct way possible. This venting process can also be referred to as self-venting.

However, venting or self-venting during operation, i.e., operational venting, is made more difficult in that the gas bubbles are forced by the flowing coolant K into circumferential cooling channels 142. On the one hand, these gas bubbles cannot pass through cooling channels 142 extending in the circumferential direction U in the direction of outlet section 143 due to buoyancy effects. On the other hand, these gas bubbles cannot rise or can only rise with difficulty into inlet section 141 due to incoming or inflowing coolant K. This results in the gas bubbles being basically stuck in circumferential cooling channels 142, in particular below inlet section 141, of which only individual or all cooling channels 142 may be affected.

Figure 3:
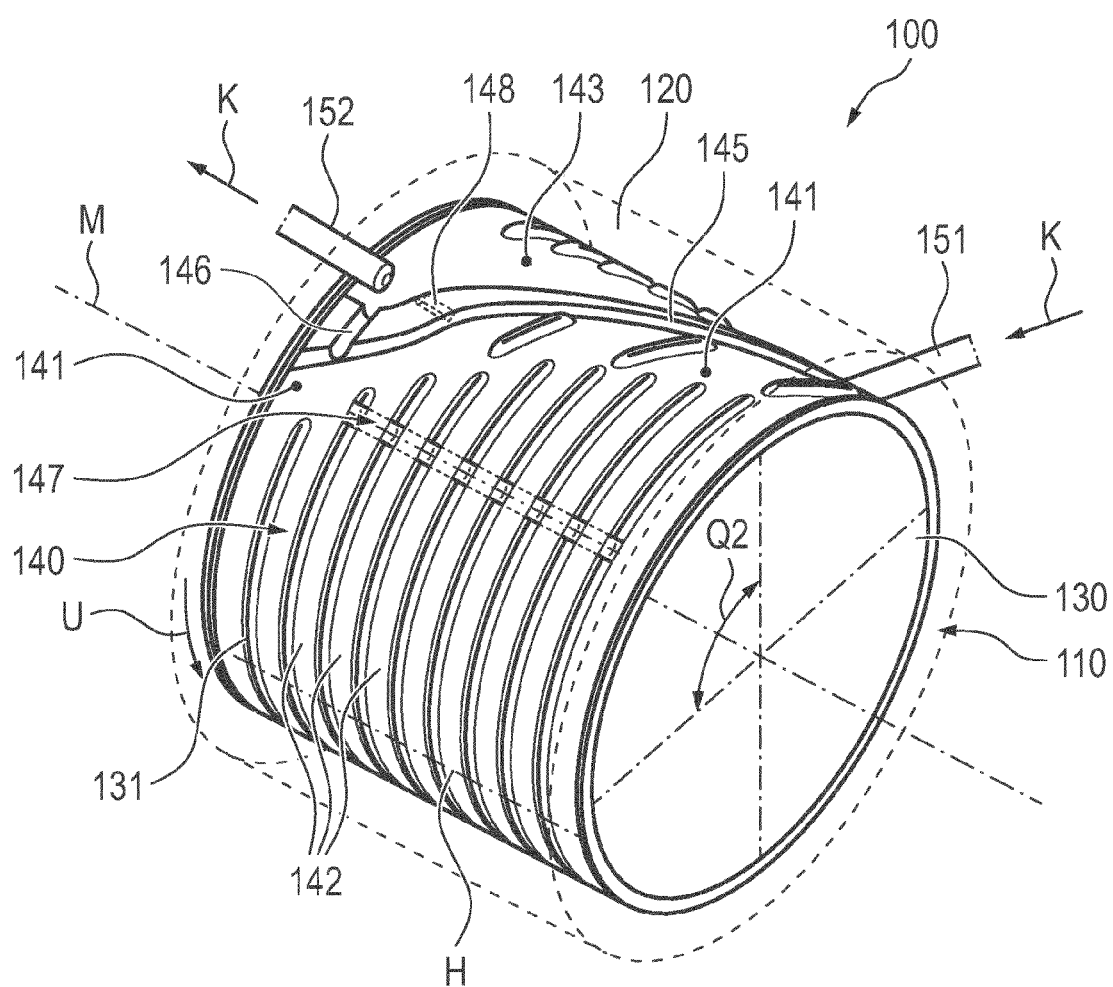
FIG. 3 shows, analogously to the illustration in FIG. 1, an example of a housing of the invention.
Figure 4:
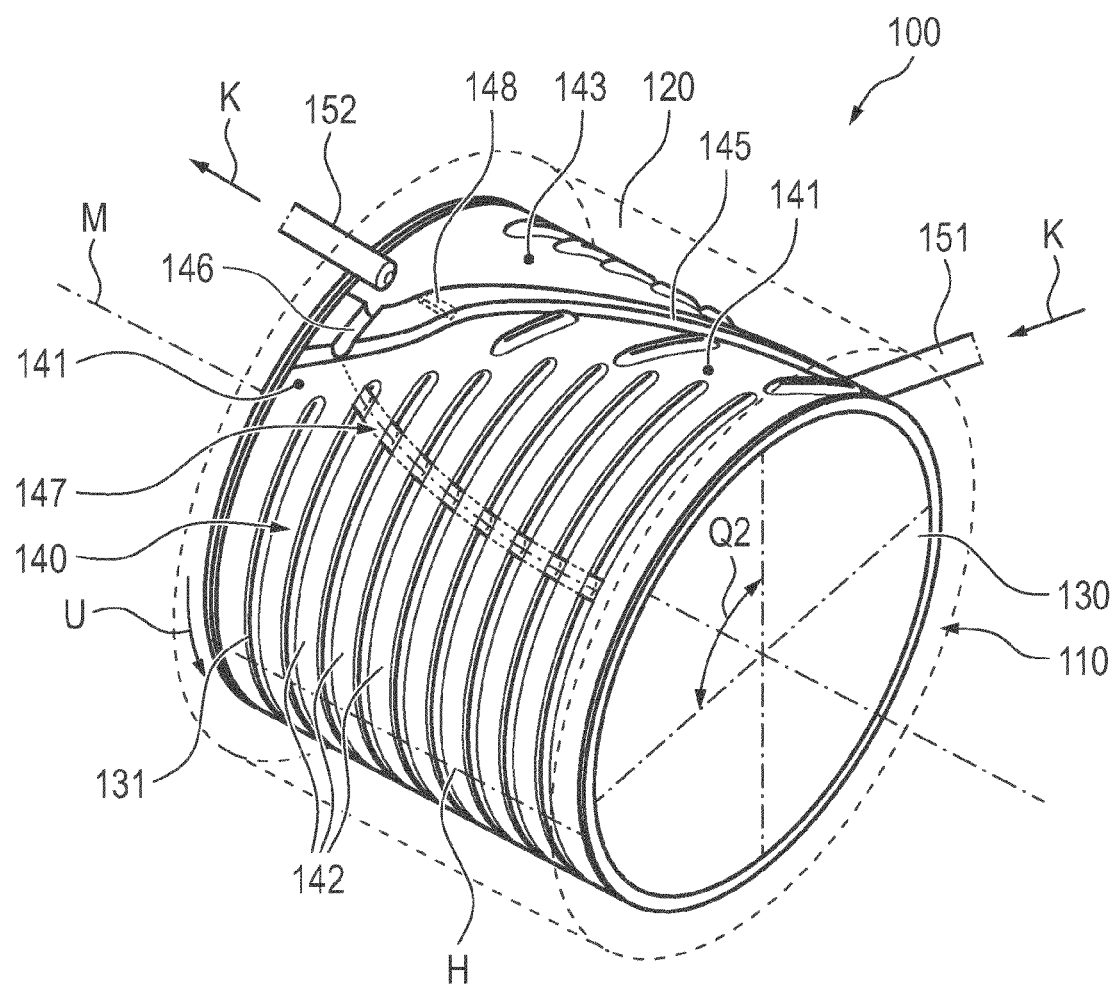
FIG. 4 shows, analogously to the illustration in FIG. 1, an example a housing of the invention.

Therefore, to improve the operational venting, it is provided that cooling channels 142 extending in the circumferential direction U are connected by a transversely extending venting channel 147, wherein venting channel 147 shown in FIG. 1 and FIG. 2 is arranged on the inlet side, i.e., in an initial region of circumferential cooling channels 142, said region facing inlet section 141, (the same applies to venting channel 147 shown in FIG. 3 and FIG. 4). Venting channel 147 is located below inlet section 141 and above the horizontal center plane H of cylindrical cooling jacket 140 (as will be explained in more detail below in connection with FIG. 5).

Venting channel 147 shown in FIG. 1 and FIG. 2 is formed as a straight groove or transverse groove extending in the axial direction of cylindrical cooling jacket 140 or parallel to its central axis M (basically a transversely extending venting groove), which cuts or crosses all circumferential ribs 131 on a line at the same vertical height and connects all circumferential cooling channels 142; i.e., the venting channel or transverse groove 147 forms breaks through circumferential ribs 131. The venting channel or transverse groove 147 can have a width of up to 10 mm in the circumferential direction U, wherein the width (in the circumferential direction U) corresponds in particular to one to four times the axial length of the respective break or the thickness of the respective circumferential rib 131.

With respect to the longitudinal extent or channel course, the two ends of the venting channel or transverse groove 147 may be referred to as the front venting channel end (which basically faces the front cooling jacket end) and the rear venting channel end (which basically faces the rear cooling jacket end). The venting channel or transverse groove 147 can also be made shorter so that it does not connect all of the circumferential cooling channels 142. Instead of a single venting channel or a single transverse groove 147, multiple venting channels or transverse grooves can also be provided which are offset from one another in the axial direction of cooling jacket 140 and/or in the circumferential direction of cooling jacket 140. Furthermore, venting channel 147 can also be designed as a transverse bore.

In the exemplary embodiment shown in FIG. 1 and FIG. 2, the venting channel or transverse groove 147 extends between the two axially outermost cooling channels 142 (at the front and rear cooling jacket ends). The rear venting channel end is located in the rear cooling jacket region below bypass 146 or its inlet opening. The venting channel or transverse groove 147 indirectly causes venting of cooling channels 142 or their initial regions toward inlet section 141 by redirecting the gas bubbles, as described above. (Notwithstanding this, there may be a so-called gap leakage between circumferential ribs 131 of inner housing 130 and the inner circumferential surface of outer housing 120, but it does not allow any specific venting. The same applies to a gap leakage at partition wall 145.)

In the embodiment shown in FIG. 3, inlet section 141 and the venting channel or transverse groove 147 are formed and arranged relative to one another such that venting channel 147 opens directly into inlet section 141 or leads to inlet section 141 without connecting all of the circumferential cooling channels 142. The rear venting channel end is located near bypass 146. Venting channel 147 basically forms an additional flow path that enables or at least promotes a direct ascent or return of the gas bubbles into inlet section 141 or to bypass 146. In other words: venting channel 147 enables or at least promotes gas bubble movement in the direction of inlet section 141 or bypass 146 during operation.

In the exemplary embodiment shown in FIG. 4, inlet section 141 and the venting channel or transverse groove 147 are formed and arranged relative to one another such that the rear venting channel end is basically oriented to bypass 146 or its inlet opening, wherein here as well not all of the circulating cooling channels 142 are connected. The venting channel or transverse groove 147 is formed curved or arcuate in shape and extends in sections at an angle to the central axis M. However, the venting channel or transverse groove 147 can also be formed straight. As in the exemplary embodiment of FIG. 3, venting channel 147 forms, as it were, an additional flow path which enables or at least promotes a direct ascent or return of the gas bubbles into inlet section 141 or to bypass 146.

Figure 5:
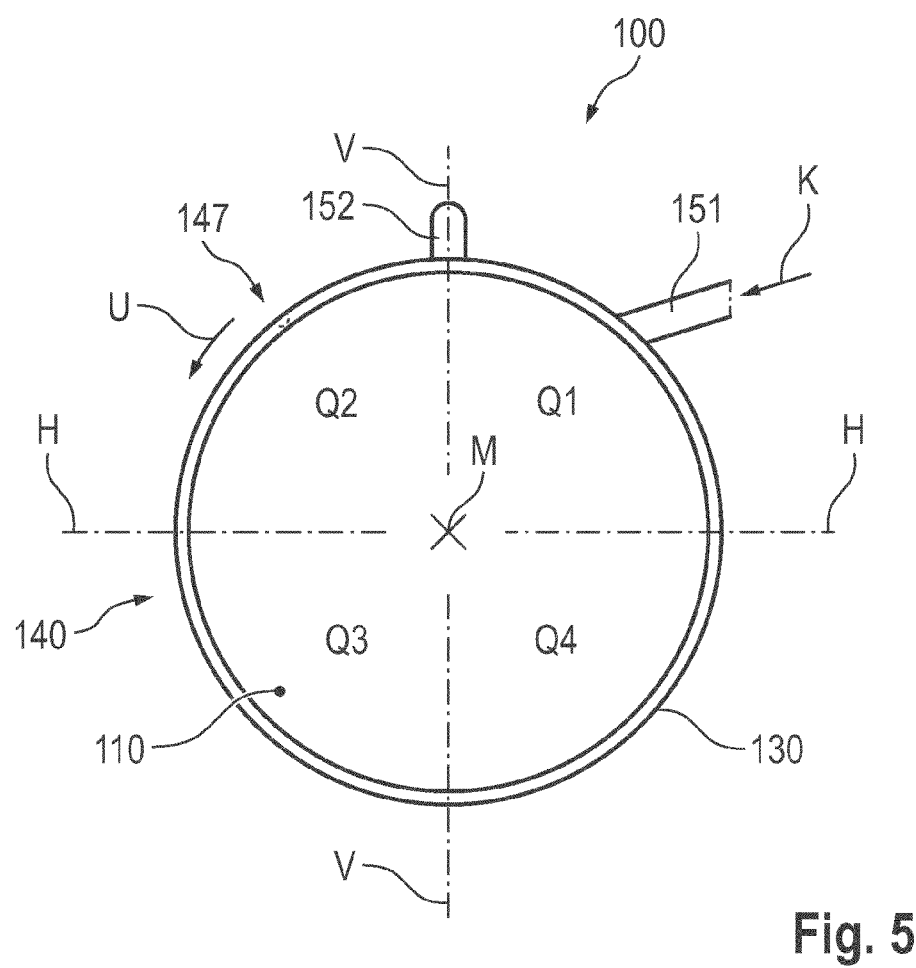
FIG. 5 shows the housing of FIG. 1 and FIG. 2 in an axial plan view.

FIG. 5 shows inner housing 130 of housing 100 of FIG. 1 and FIG. 2 in an axial plan view with the viewing direction D indicated in FIG. 2. The horizontal center plane is denoted by H and the vertical center plane is denoted by V. The flow of coolant K through cooling channels 142 of cooling jacket 140 is counterclockwise (-CW) with respect to the axial plan view shown, corresponding to the direction arrow U for the circumferential direction. Cooling jacket 140 can be divided into four quadrants, each extending in a 90° arc between the center planes, and according to common convention (with respect to a coordinate system) can be referred to as first quadrant Q1, second quadrant Q2, third quadrant Q3, and fourth quadrant Q4. The inlet opening or bore 151 is located in the first quadrant Q1 at approximately a 2 o'clock position, but may also be located lower or higher. The outlet opening or bore 152 is basically located between the first quadrant Q1 and the second quadrant Q2 at a 12 o'clock position (therefore, at the highest point). The same applies analogously to the exemplary embodiments shown in FIG. 3 and FIG. 4.

Venting channel 147 is located on the downflow side or half of the cooling jacket (see above) between the vertical center plane V and the horizontal center plane H, therefore, in the second quadrant Q2, which can also be described as the sector from 9 o'clock to 12 o'clock. The same applies analogously to the exemplary embodiments shown in FIG. 3 and FIG. 4. During operation, in particular after a preceding operational break, most of the gas bubbles are located in this region (due to a force equilibrium between the buoyancy force and the pressure force of the incoming coolant K or coolant flowing into the circumferential cooling channels 142), as described above. Bypass 146 and venting channel 147 enable venting and self-venting, respectively, of cooling jacket 140 in the second quadrant Q2 during operation (i.e., when the pump is on), as explained above. As described above, a varying pump pressure or pump delivery rate can promote venting.

The exemplary embodiments shown in the figures and explained above can be varied within the scope of the invention. In particular, the features of various exemplary embodiments can also be combined overall to form further exemplary embodiments.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A housing for an electrical machine, the housing comprising:
   a cylindrical cooling jacket through which a coolant is adapted to flow;
   a plurality of cooling channels that extend in a circumferential direction;
   an inlet section acting as a distributor;
   an outlet section acting as a collector;
   a partition wall arranged between the inlet section and the outlet section, the partition wall having a bypass through which gas bubbles present in the inlet section are diverted directly to the outlet section; and
   at least one transversely extending venting channel connecting the cooling channels that extend in the circumferential direction,
   wherein the cooling channels extending in the circumferential direction from the inlet section and open into the outlet section,
   wherein the cylindrical cooling jacket is constructed by an outer housing and an inner housing having circumferential ribs and circumferential grooves located therebetween, the circumferential grooves each forming a respective one of the cooling channels, and
   wherein the venting channel is formed on the inner housing as a transverse groove that cuts through at least some of the circumferential ribs to connect the circumferential grooves, such that the at least some of the circumferential ribs each has a notch cut-out that aligns with one another to form the transverse groove.

2. The housing according to claim 1, wherein a horizontal arrangement of the electrical machine in the housing and an associated horizontal orientation of the cylindrical cooling jacket are provided, and wherein the venting channel is located on a downflow cooling jacket side above a horizontal center plane.

3. The housing according to claim 1, wherein the venting channel is formed straight.

4. The housing according to claim 1, wherein the venting channel is formed curved.

5. The housing according to claim 1, wherein the venting channel extends between two axially outermost cooling channels of the cooling channels, such that each end of the venting channel opens into each of the two axially outermost cooling channels, respectively.

6. The housing according to claim 1, wherein one open end of the venting channel opens directly into the inlet section and/or is directed towards the bypass.

7. The housing according to claim 1, wherein the inner housing is formed as a one-piece cast part or a metal cast part, wherein the circumferential ribs, the circumferential grooves and the transverse groove are produced by casting.

8. The housing according to claim 1, wherein the bypass in the partition wall is directed toward an outlet opening in the outlet section.

9. The housing according to claim 1, wherein the housing is adapted to cool the electrical machine, wherein a flow of the coolant through the cylindrical cooling jacket is generated by a pump and a pump pressure and/or a pump delivery rate are varied by the pump.

10. The housing according to claim 1, wherein the bypass extends in the circumferential direction, with one end of the bypass opening into the outlet section adjacent to an outlet opening of the outlet section.

11. The housing according to claim 1, further comprising a second bypass that extends transversely through the partition wall, with one end of the second bypass opening into the outlet section adjacent to an outlet opening of the outlet section.

12. The housing according to claim 1, wherein the notch cut-out of each of the at least some of the circumferential ribs separates the respective circumferential rib into two circumferentially extending sections.

\* \* \* \* \*